United States Patent
Yang

(10) Patent No.: US 8,189,982 B2
(45) Date of Patent: May 29, 2012

(54) HOUSING STRUCTURE FOR PLUGGABLE TRANSCEIVER MODULE

(75) Inventor: Haven Yang, Taipei Hsien (TW)

(73) Assignee: All Best Precision Technology Co., Ltd., Taoyuan County (TW)

( * ) Notice: Subject to any disclaimer, the term of this patent is extended or adjusted under 35 U.S.C. 154(b) by 302 days.

(21) Appl. No.: 12/639,333

(22) Filed: Dec. 16, 2009

(65) Prior Publication Data
US 2011/0142405 A1 Jun. 16, 2011

(51) Int. Cl.
*G02B 6/00* (2006.01)
(52) U.S. Cl. ........................................... 385/134
(58) Field of Classification Search .................. None
See application file for complete search history.

(56) References Cited

U.S. PATENT DOCUMENTS

| | | | | |
|---|---|---|---|---|
| 5,254,010 A | * | 10/1993 | Davis | 439/108 |
| 7,249,966 B2 | * | 7/2007 | Long | 439/541.5 |
| 7,387,527 B2 | * | 6/2008 | Kim et al. | 439/372 |
| 7,421,184 B2 | * | 9/2008 | Long | 385/146 |
| 7,601,021 B1 | * | 10/2009 | Yang | 439/487 |
| 7,609,922 B2 | * | 10/2009 | Aoki et al. | 385/49 |
| 7,871,294 B2 | * | 1/2011 | Long | 439/541.5 |
| 7,963,795 B1 | * | 6/2011 | Yang | 439/490 |
| 2006/0003628 A1 | * | 1/2006 | Long et al. | 439/541.5 |
| 2007/0123090 A1 | * | 5/2007 | Kim et al. | 439/372 |
| 2011/0143584 A1 | * | 6/2011 | Yang | 439/577 |

* cited by examiner

*Primary Examiner* — Sung Pak
(74) *Attorney, Agent, or Firm* — WPAT, P.C.; Anthony King

(57) ABSTRACT

A housing structure for pluggable transceiver module includes an insertion base, at least two light-guiding units separately connected to two lateral sides of the insertion base, and an enclosure enclosing the insertion base and the light-guiding units therein. The enclosure is set on two lateral sides with a plurality of inward protruded elastic pressing tabs for elastically pressing against lateral outer surfaces of the two light-guiding units. When the insertion base and the light-guiding units have been enclosed in the enclosure, the elastic pressing tabs on the enclosure further elastically press against the outer side surfaces of the light-guiding units to ensure more stable and firm connection of the light-guiding units to the enclosure.

5 Claims, 7 Drawing Sheets

A-A

X

B-B

HOUSING STRUCTURE FOR PLUGGABLE TRANSCEIVER MODULE

FIELD OF THE INVENTION

The present invention relates to a housing structure for pluggable transceiver module, and more particularly to a housing structure for pluggable transceiver module that ensures firm and stable connection of an enclosure to light-guiding units enclosed therein.

BACKGROUND OF THE INVENTION

A conventional housing structure for pluggable transceiver module, as shown in FIG. 8, includes a base 40, two light-guiding members 41, a fixing block 42, two clamping plates 43, a cover 44, a bottom plate 45, a back plate 46, and a fixing frame 47. To assemble these components to complete a pluggable transceiver module, first fixedly connect the two light guiding members 41 to a front end surface of the base 40, so that the two light guiding members 41 are vertically spaced to separately locate at an upper and a lower position. Then, couple the fixing block 42 to another end of the two light guiding members 41 opposite to the base 40, and insert one end of the two clamping plates 43 into the front end surface of the base 40. Thereafter, enclose a subassembly of the base 40, the light guiding members 41, the fixing block 42 and the clamping plates 43 in the cover 44. Finally, sequentially connect the bottom plate 45, the back plate 46 and the fixing frame 47 to the cover 44 to complete the pluggable transceiver module.

According to the conventional housing structure for pluggable transceiver module, when assembling the base 40 and the light-guiding members 41 to the cover 44, it is necessary to utilize the fixing block 42, the clamping plates 43, the bottom plate 45, the back plate 46 and the fixing frame 47, resulting in high difficulty in handling and assembling these components into the pluggable transceiver module. Furthermore, there is not any structure for securely holding the light-guiding members 41 to the cover 44 after the assembly is completed, and the light-guiding members 41 are subject to deviation in the cover 44 due to an external force applied to the pluggable transceiver module. That is, the light-guiding members 41 are not firmly fixed to the cover 44.

It is therefore desirable to develop an improved housing structure for pluggable transceiver module that ensures firm and stable connection of an enclosure to light-guiding units enclosed therein to thereby eliminate the problems in the conventional housing structure for pluggable transceiver module.

SUMMARY OF THE INVENTION

A primary object of the present invention is to provide a housing structure for pluggable transceiver module that ensures firm and stable connection of an enclosure to light-guiding units and insertion base enclosed therein by providing elastic pressing tabs on the enclosure to elastically press against outer side surfaces of the light-guiding units.

To achieve the above and other objects, the housing structure for pluggable transceiver module according to the present invention includes an insertion base, at least two light-guiding units separately connected to two lateral sides of the insertion base, and an enclosure enclosing the assembled insertion base and light-guiding units therein. The enclosure is provided on two lateral sides with a plurality of inward protruded elastic pressing tabs for elastically pressing against lateral outer surfaces of the two light-guiding units.

Therefore, when the insertion base and the light-guiding units have been enclosed in the enclosure, the elastic pressing tabs on the enclosure further elastically press against the outer side surfaces of the light-guiding units to ensure more stable and firm connection of the light-guiding units to the enclosure.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
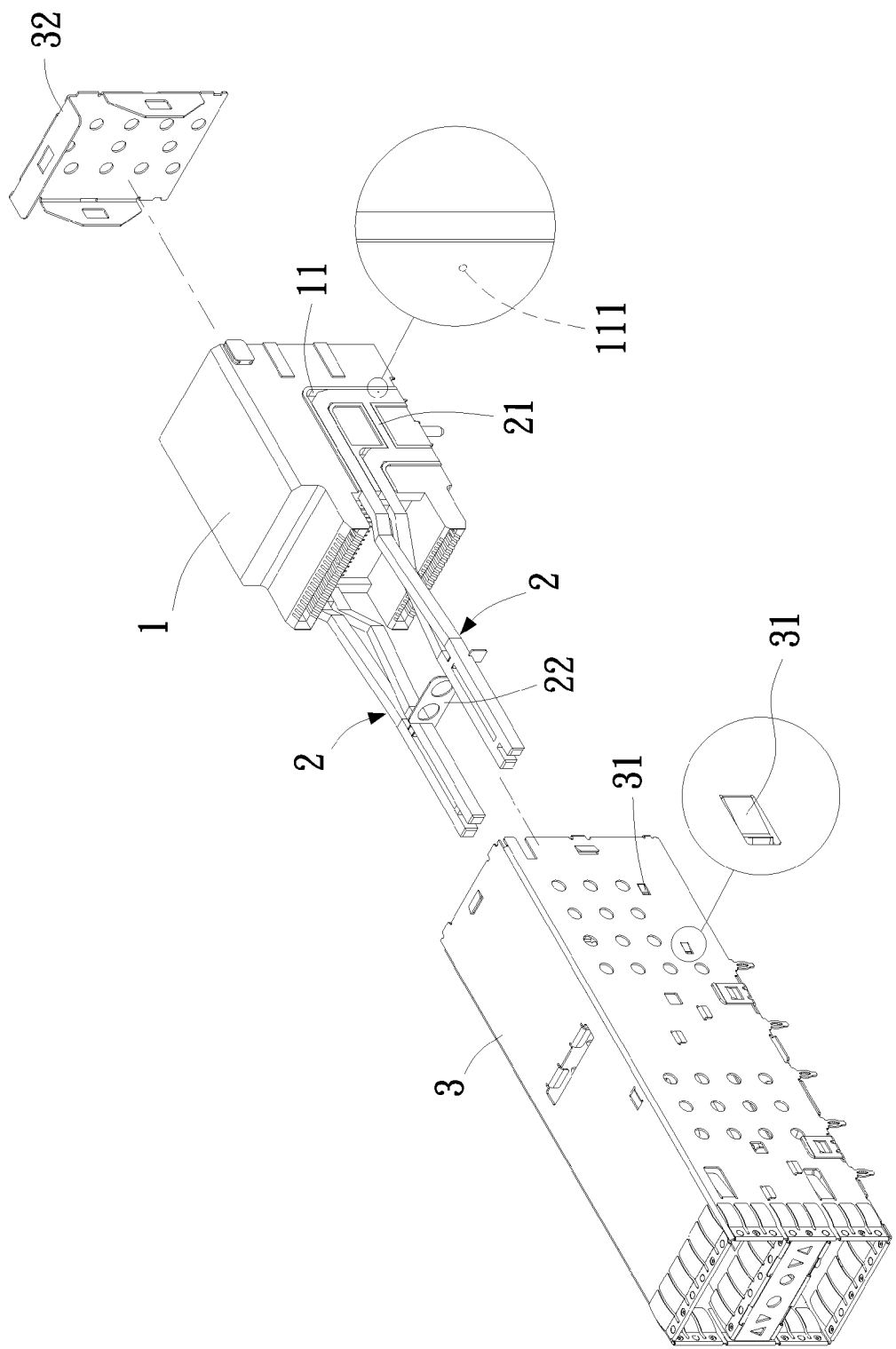
FIG. 1 is an exploded perspective view of a housing structure for pluggable transceiver module according to a first embodiment of the present invention.
Figure 2:
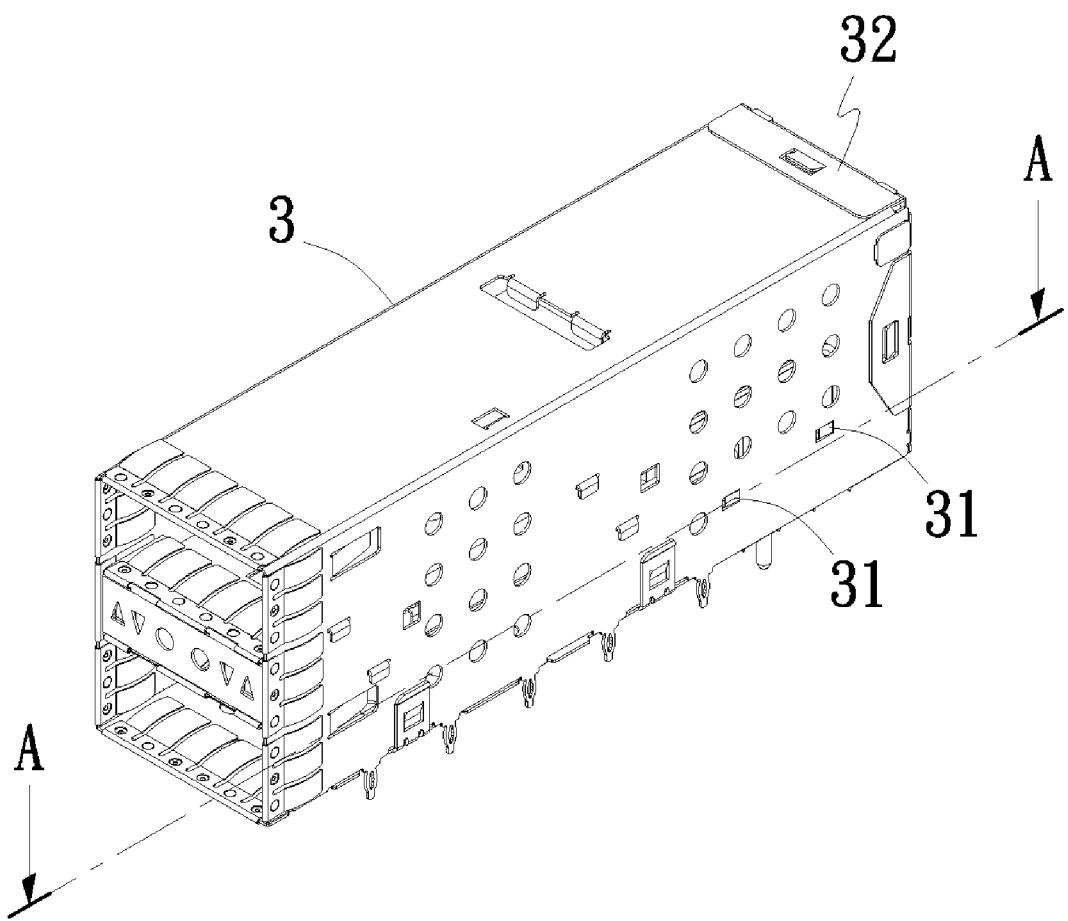
FIG. 2 is an assembled view of FIG. 1.
Figure 3:
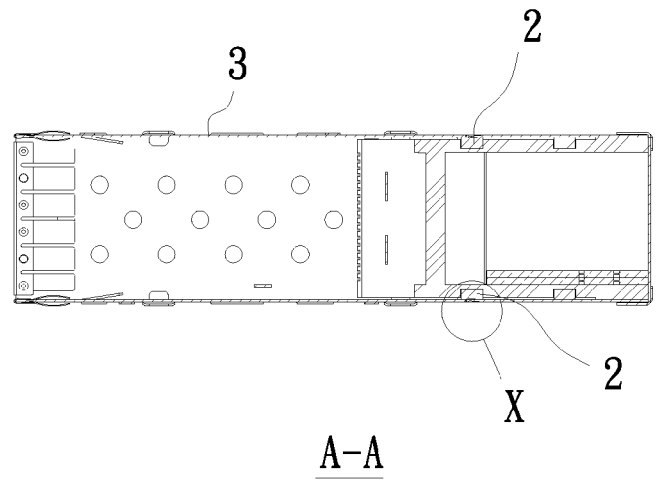
FIG. 3 is a sectional view taken along line A-A of FIG. 2.

Please refer to FIGS. 1 and 2 that are exploded and assembled perspective views, respectively, of a housing structure for pluggable transceiver module according to a first embodiment of the present invention, and to FIG. 3 that is a sectional view taken along line A-A of FIG. 2. As shown, the housing structure for pluggable transceiver module in the first embodiment of the present invention includes an insertion base 1, two light-guiding units 2, and an enclosure 3.

The insertion base 1 is provided at two opposite lateral sides with a locating recess 11 each, and the locating recesses 11 are provided on respective wall surface with a plurality of protrusions 111.

The light-guiding units 2 are separately connected to the two lateral sides of the insertion base 1. Each of the light-guiding units 2 has a rear end formed into a locating section 21. The locating sections 21 are separately fitly received in the two locating recesses 11 with the protrusions 111 on the wall surfaces of the locating recesses 11 pressed against an inner side surface of each of the locating sections 21.

Figure 4:
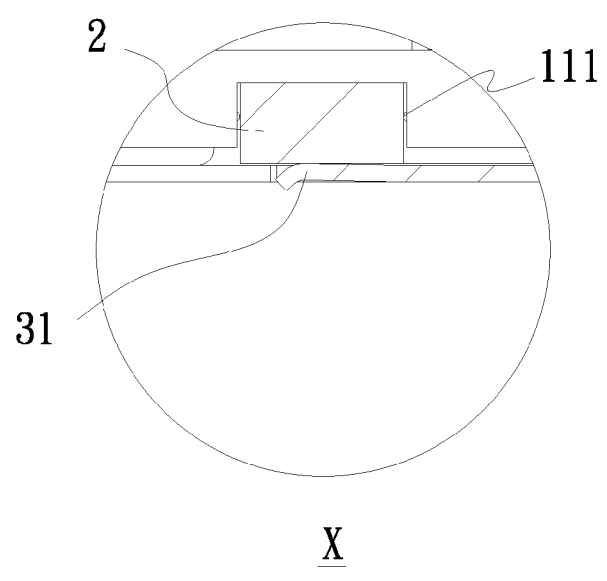
FIG. 4 is an enlarged view of the circled area X of FIG. 3.

The enclosure 3 encloses the insertion base 1 and the light-guiding units 2 therein. The enclosure 3 is provided on each of two lateral sides thereof with two inward protruded elastic pressing tabs 31. The elastic pressing tabs 31 press against an outer side surface of each of the light-guiding units 2, as can be more clearly seen from FIG. 4 that is an enlarged view of the circled area X of FIG. 3. While the illustrated first embodiment has two elastic pressing tabs 31 provided on each of two lateral sides of the enclosure 3, it is understood the number of the elastic pressing tabs 31 can be one or more than two for each of the lateral sides of the enclosure 3, depending on actual need in practical application of the pluggable transceiver module. An end cover 32 is connected to a rear end of the enclosure 3.

To assemble the present invention, the locating sections 21 of the light-guiding units 2 are directly fitted in the locating recesses 11 at two lateral sides of the insertion base 1, such that the protrusions 111 on the wall surfaces of the locating recesses 11 are pressed against inner side surfaces of the locating sections 21. Thereafter, a holding bracket 22 is connected to the light-guiding units 2 for holding the latter in place. Finally, an assembly of the insertion base 1 and the light-guiding units 2 is extended into and connected to the enclosure 3. At this point, the elastic pressing tabs 31 on the two lateral sides of the enclosure 3 elastically press against the outer side surfaces of the light-guiding units 2 to further stably hold the light-guiding units 2 in the enclosure 3. Then, the end cover 32 is closed onto the rear end of the enclosure 3 to complete a pluggable transceiver module. With the above arrangements, the insertion base 1, the light-guiding units 2 and the enclosure 3 forming the pluggable transceiver module can be firmly connected to one another.

Figure 5:
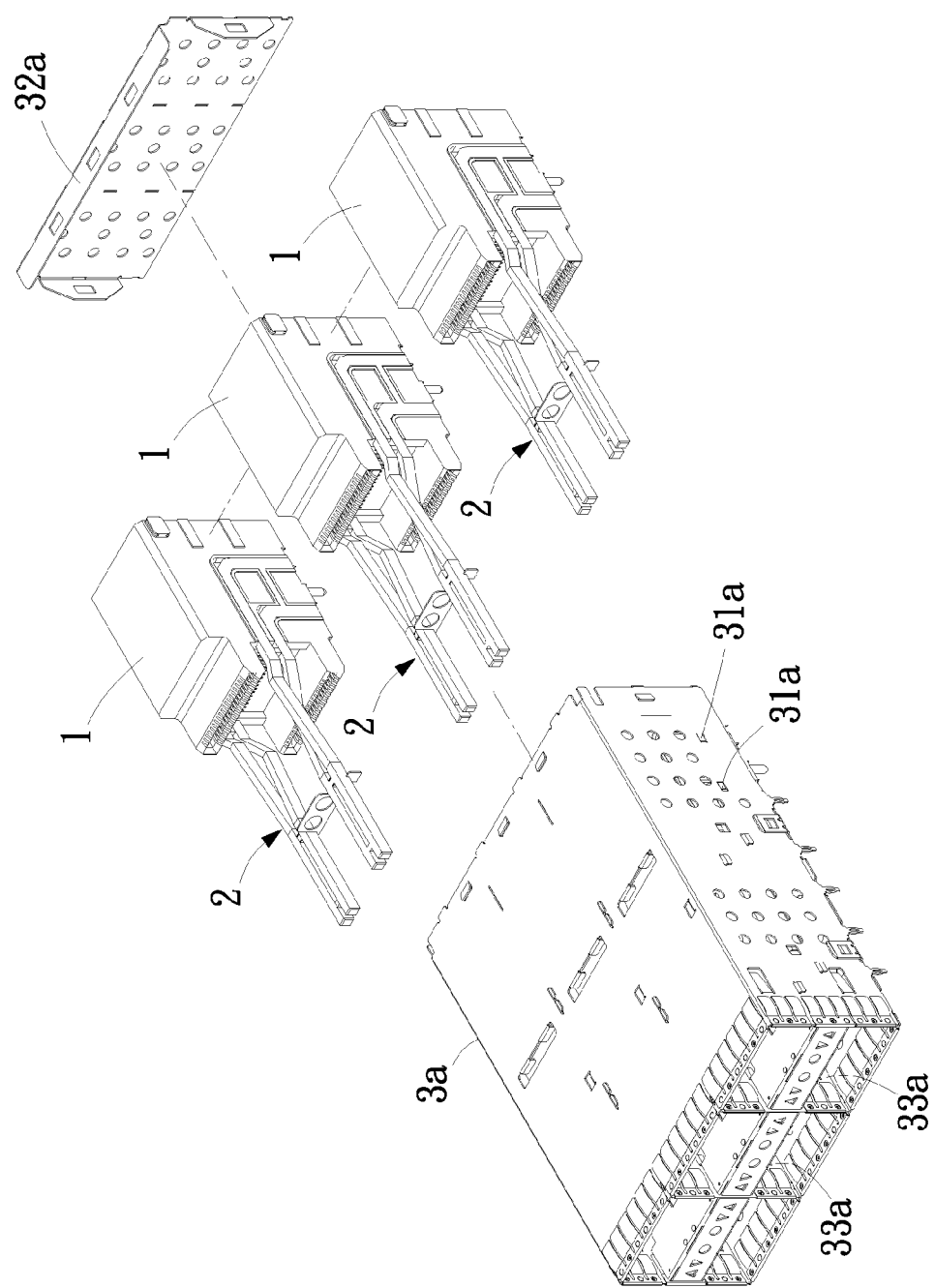
FIG. 5 is an exploded perspective view of a housing structure for pluggable transceiver module according to a second embodiment of the present invention.
Figure 6:
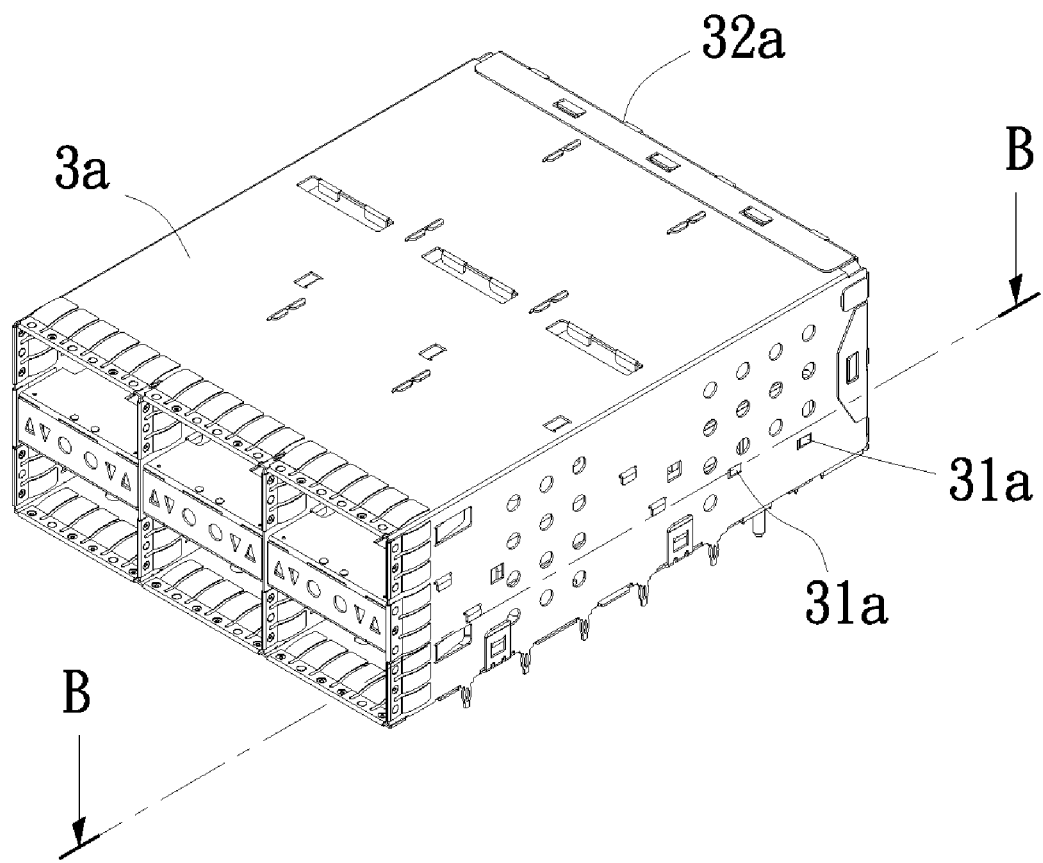
FIG. 6 is an assembled view of FIG. 5.
Figure 7:
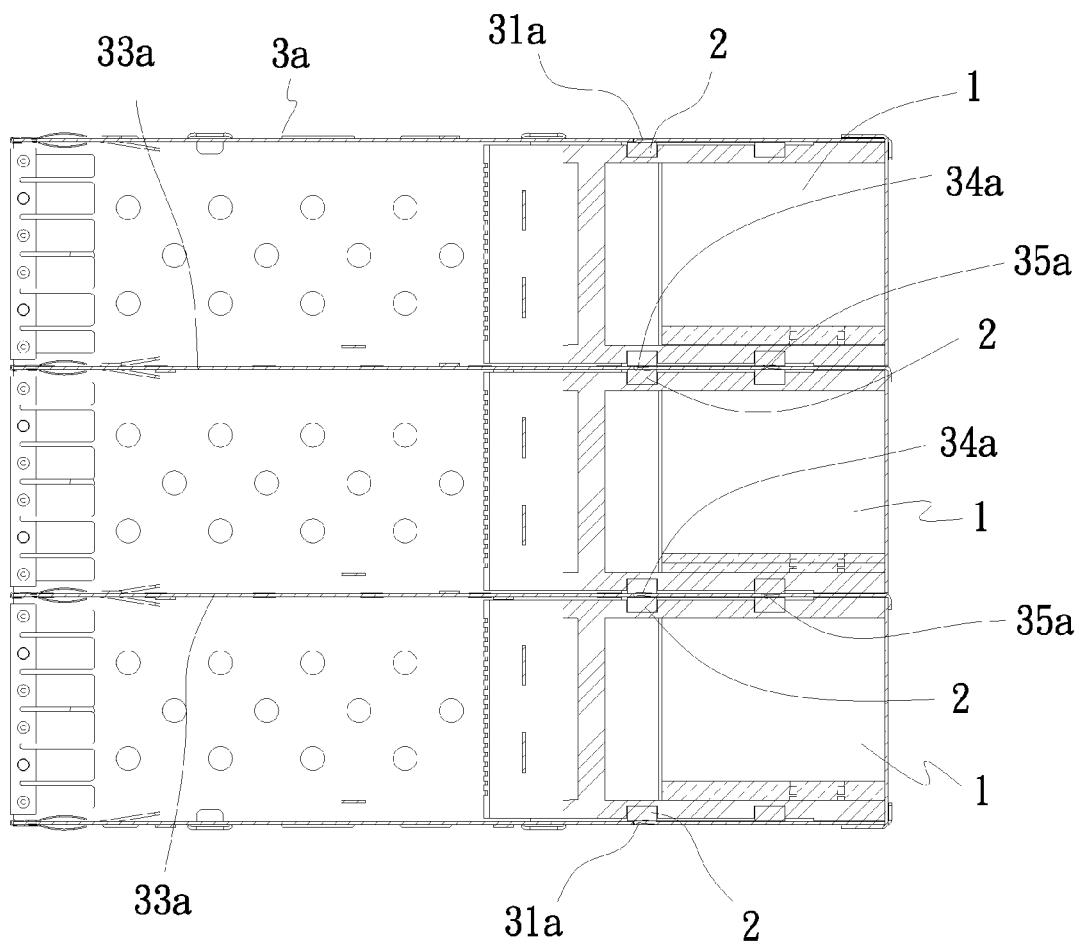
FIG. 7 is a sectional view taken along line B-B of FIG. 6.
Figure 8:
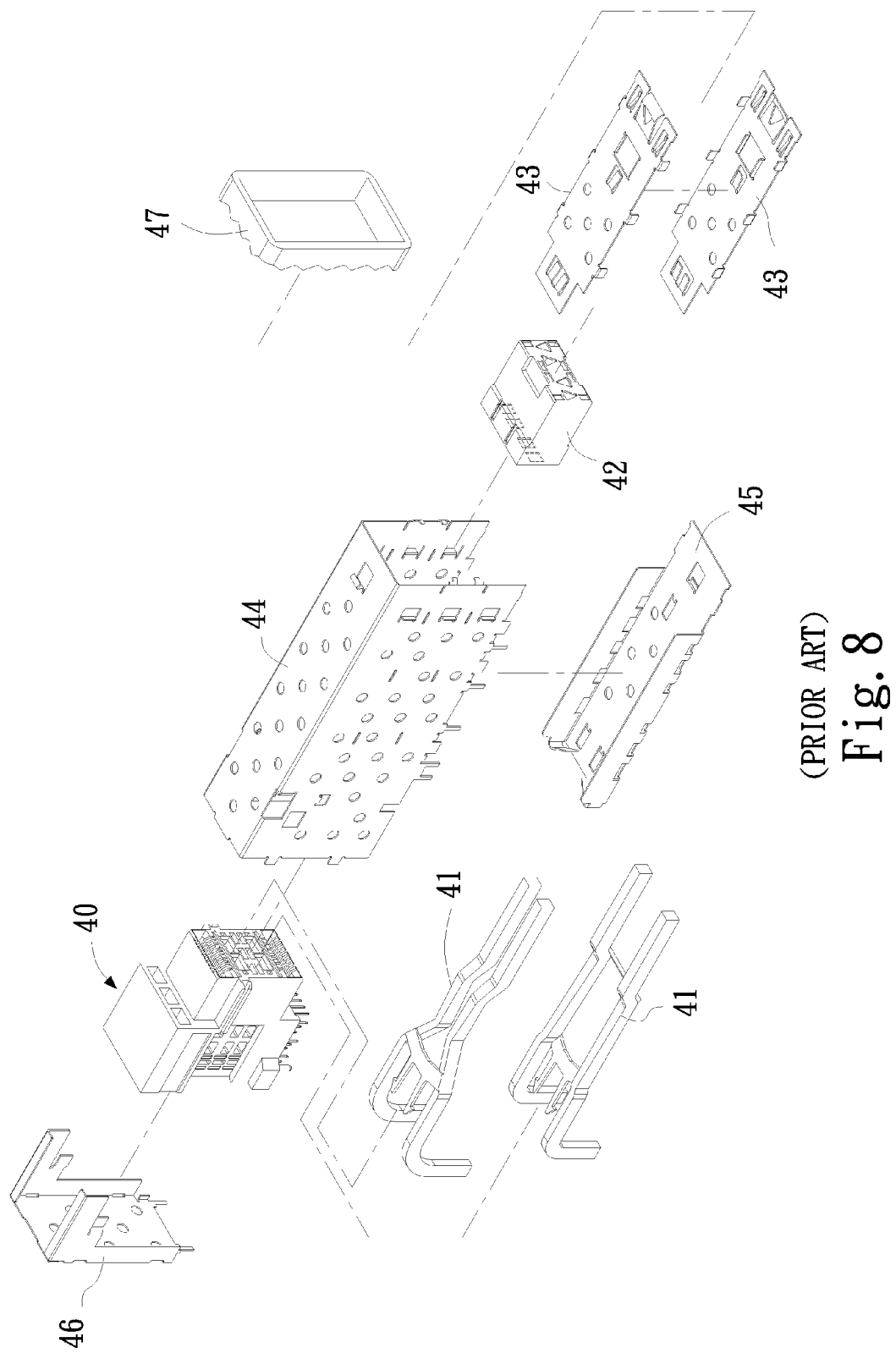
FIG. 8 is an exploded perspective view of a conventional housing structure for pluggable transceiver module.

FIGS. 5 and 6 are exploded and assembled perspective views, respectively, of a housing structure for pluggable transceiver module according to a second embodiment of the present invention, and FIG. 7 is a sectional view taken along line B-B of FIG. 6. The second embodiment is generally structurally similar to the first embodiment, except for an enclosure 3a and an end cover 32a that have enlarged size to meet actual need in practical application of the pluggable transceiver module. The size-enlarged enclosure 3a is internally provided with a plurality of parallelly spaced upright partitions 33a to divide an internal space of the enclosure 3a into a plurality of sub-spaces, in each of which an assembly of the insertion base 1 and the light-guiding units 2 is received. Each of the partitions 33a is provided on two opposite sides with a plurality of elastic pressing tabs 34a and a plurality of elastic pressing tabs 35a, respectively, which are protruded from the partition 33a in two opposite directions. While the illustrated second embodiment of the present invention has total four elastic pressing tabs 34a and 35a provided on each of the partitions 33a, it is understood the total number of the elastic pressing tabs 34a and 35a provided on each of the partitions 33a can be two or more than four, depending on actual need in practical application of the pluggable transceiver module. With the elastic pressing tabs 34a, 35a provided on the partitions 33a and elastic pressing tabs 31a provided on two lateral sides of the enclosure 3a separately press against the outer side surfaces of the light-guiding units 2, the insertion bases 1, the light-guiding units 2 and the enclosure 3a forming the pluggable transceiver module can be firmly connected to one another.

In the present invention, after the insertion base, the light-guiding units and the enclosure are assembled to one another, the elastic pressing tabs provided on the enclosure further firmly press against the outer side surfaces of the light-guiding units for the light-guiding units to more securely associate with the enclosure to thereby eliminate the problems in the conventional housing structure for pluggable transceiver module. Therefore, the present invention is novel and improved, and any product derived from the present invention would no doubt full satisfy the current demands in the market, making the present invention industrially practical for use.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A housing structure for pluggable transceiver module, comprising:
   an insertion base;
   two light-guiding units being separately connected to two lateral sides of the insertion base; and
   an enclosure enclosing the insertion base and the light-guiding units therein; and the enclosure being provided on two lateral sides with a plurality of inward protruded elastic pressing tabs for elastically pressing against lateral outer surfaces of the two light-guiding units.

2. The housing structure for pluggable transceiver module as claimed in claim 1, wherein the insertion base is provided on the two lateral sides with a locating recess each, and each of the light-guiding units has a rear end formed into a locating section; and the two locating sections being separately fitly received in the two locating recesses.

3. The housing structure for pluggable transceiver module as claimed in claim 2, wherein the locating recesses are provided on respective wall surface with a plurality of protrusions for pressing against inner side surfaces of the locating sections of the light-guiding units.

4. The housing structure for pluggable transceiver module as claimed in claim 1, wherein the enclosure is provided on each of the two lateral sides with two elastic pressing tabs, and has a rear end being closed with an end cover.

5. The housing structure for pluggable transceiver module as claimed in claim 1, wherein the enclosure is provided on each of the two lateral sides with two elastic pressing tabs, and has a rear end being closed with an end cover; and wherein the enclosure is internally provided with a plurality of parallelly spaced upright partitions, and each of the partitions being provided on each of two opposite sides with a plurality of protruded elastic pressing tabs.

* * * * *